(12) United States Patent
Tournier

(10) Patent No.: US 6,951,266 B2
(45) Date of Patent: Oct. 4, 2005

(54) ROTATION-RETARDING DEVICE AND USE THEREOF

(75) Inventor: Ludovic Tournier, Saint Marcellin (FR)

(73) Assignee: ITW Fastex France Zac les Echavagnes, Saint Marcellin (FR)

( * ) Notice: Subject to any disclaimer, the term of this patent is extended or adjusted under 35 U.S.C. 154(b) by 0 days.

(21) Appl. No.: 10/356,630

(22) Filed: Feb. 3, 2003

(65) Prior Publication Data

US 2003/0146061 A1 Aug. 7, 2003

(30) Foreign Application Priority Data

Feb. 4, 2002 (FR) .............................................. 02 01311

(51) Int. Cl.⁷ ................................................. F16F 7/04
(52) U.S. Cl. .......................................... 188/130; 188/83
(58) Field of Search ................................ 188/129, 130, 188/83

(56) References Cited

U.S. PATENT DOCUMENTS 5,582,276 A    12/1996  Berteau
5,875,874 A  *  3/1999  Okabe et al. ................ 188/130

FOREIGN PATENT DOCUMENTS

| DE | 86 21 214 U | 12/1987 |
|---|---|---|
| DE | 86 21 214.1 | 1/1988 |
| DE | 197 26 536 A1 | 12/1998 |
| DE | 197 26 536 A | 12/1998 |
| EP | 0 572 771 A | 12/1993 |
| EP | 0 572 771 A1 | 12/1993 |
| EP | 1 174 576 A | 1/2002 |
| EP | 1 174 576 A1 | 1/2002 |
| GB | 2 343 918 A | 5/2000 |
| GB | 2 343 918 | 5/2000 |
| WO | WO 98 29631 A | 7/1998 |

OTHER PUBLICATIONS

Patent Abstract of Japan—Publication No. 2000199535—Published Jul. 18, 2000.
Patent Abstract of Japan—Publication No. 2000097227—Published Apr. 4, 2000.
Patent Abstract of Japan—Publication No. 11193814—Published Jul. 21, 1999.

* cited by examiner

*Primary Examiner*—Matthew C. Graham
(74) *Attorney, Agent, or Firm*—Lowe Hauptman & Berner, LLP

(57) ABSTRACT

A rotation-retarding device includes two members having rotational movement relative to each other to be retarded. The first member has an axle and the second member has a housing (25) adapted to receive the axle. A retarding arrangement includes at least a part of the wall (24) of the housing. The wall is made of elastically deformable flexible material, and has, facing the axle, at least one working surface (28) of cam form. The retarding arrangement also includes at least one projection on that axle, adapted to cooperate with the working surface (28) associated therewith to retard the movement with the resisting couple being adapted to the driving couple at each angular position.

29 Claims, 3 Drawing Sheets

ROTATION-RETARDING DEVICE AND USE THEREOF

FIELD OF THE INVENTION

The present invention relates to a rotation-retarding device comprising a first member and a second member having rotational movement relative to each other to be retarded.

BACKGROUND OF THE INVENTION

Many members, such as the lids of make-up boxes, washing machines or automotive vehicle glove compartments, have their opening actuated, for example by springs, or are brought to the open position under the effect of gravity.

In practice, a rotation-retarding device is thus generally implemented to give smooth, dampened opening of the lid.

According to an arrangement already known, a viscous fluid, such as a silicone oil, is used to retard the rotation of a rotor with respect to a stator by virtue of its viscosity. This type of rotation-retarding device does not enable sufficient couples to be produced in a compact space, such as that available for a hinge of a make-up box.

According to another arrangement already known, the rotation-retarding device is obtained by deformation of elastically deformable flexible material. These friction-based rotation-retarding devices give a constant couple which does not guarantee opening that is complete and of good quality.

SUMMARY OF THE INVENTION

The present invention generally relates to a friction-based rotation-retarding device guaranteeing complete opening of good quality which leads, furthermore, to other advantages.

More particularly, it relates to a rotation-retarding device comprising a first member and a second member having rotational movement relative to each other to be retarded, the first member comprising an axle and the second member comprising a housing adapted to receive the axle of the first member, and means for retarding rotation by deformation of elastically deformable flexible material, characterized in that the retarding means comprise at least a part of the wall bounding the housing, of elastically deformable flexible material and comprising at least one working surface of cam form, facing the axle of the first member, and at least one projection of rigid material on the axle of the first member, adapted to cooperate with a working surface associated therewith to retard the rotational movement with the resisting couple being adapted to the driving couple at each angular position.

The resisting couple generated by virtue of the cam form of this rotation-retarding device is thus matched with the driving couple provided, for example, by an opening actuator spring, which makes it possible to guarantee the quality of the opening movement as well as complete opening.

Furthermore, the manufacture of this rotation-retarding device proves to be relatively easy, given the small number of parts to produce and assemble, in particular in the case in which at least some of the parts are obtained by molding in a plastics material.

The rotation-retarding device according to the invention thus proves to be low cost.

Preferably, for reasons of economy, ease of manufacture, ease of assembly and/or efficacy of operation:

the entire wall of the housing is of elastically deformable flexible material, and/or each working surface of cam form extends over the entire length of the wall of the housing, and/or the wall of the housing comprises two working surfaces of cam form which are symmetrical with respect to an axis of symmetry of the wall, and/or each projection is formed by a gadroon extending along a generatrix of the axle of the first member, and/or the wall comprises a hollow for each projection, by means of which each projection is housed in a resting position, and/or the wall comprises at least one groove of U-shaped cross-section, extending substantially parallel to the axis of symmetry of the wall and adapted to receive a gadroon in a resting position, and/or each groove is connected to a working surface adapted to cooperate with the gadroon housed in that groove in resting position, by a longitudinal recess formed by two facets which together form an obtuse angle, and/or the wall comprises two grooves, each adapted to receive one of the two gadroons diametrically opposite of the axle of the first member, these grooves and the adjacent recesses being respectively symmetrical with respect to the axis of symmetry of the wall of the housing, and/or the elastically deformable flexible material is a thermoplastic elastomer, and/or the thermoplastic elastomer has a hardness between a shore A value of 55 and a shore D value of 50, and/or the thermoplastic elastomer is Santoprene®, and/or the material of which the first member is made is a rigid material, preferably chosen from the group comprising a polyether, a polyolefin, or a polyamide, and/or the polyether is a polyacetal, and/or the first member is a rotor comprising, in a T-shaped general configuration, the axle extended by a coaxial head and the second member is a stator comprising an axially symmetrical tubular envelope forming the housing, and/or the head and the envelope each comprise connection means by which the rotor and the stator are respectively able to be connected to a first and a second part having rotational movement relative to each other to be retarded.

According to another aspect, the present invention also relates to the use of a rotation-retarding device as set out above in order to slow the rotational movement of an opening member. Retarding the rotation of an opening member in rotational movement with respect to another member thus proves particularly easy to implement.

This aspect of the invention is moreover very desirable in the case in which the opening member is a make-up box lid.

BRIEF DESCRIPTION OF THE DRAWINGS

The description of the present invention will continue with the description of a preferred embodiment, given below by way of non-limiting example, with reference to the accompanying drawings in which.

DETAILED DESCRIPTION OF THE INVENTION

In the form of embodiment shown, the rotation-retarding device 10 according to the invention comprises a stator 11 and a rotor 12 adapted to be given the rotational movement to be retarded.

Figure 1:
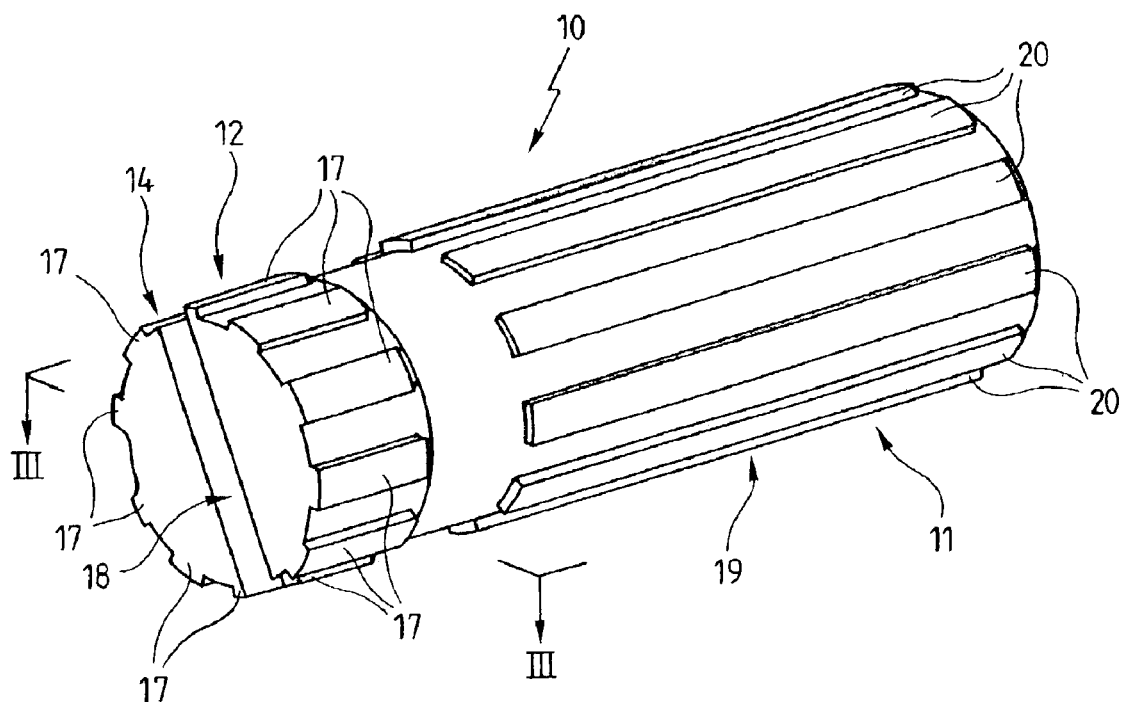
FIG. 1 is a perspective view of a rotation-retarding device according to the preferred embodiment of the present invention.
Figure 2:
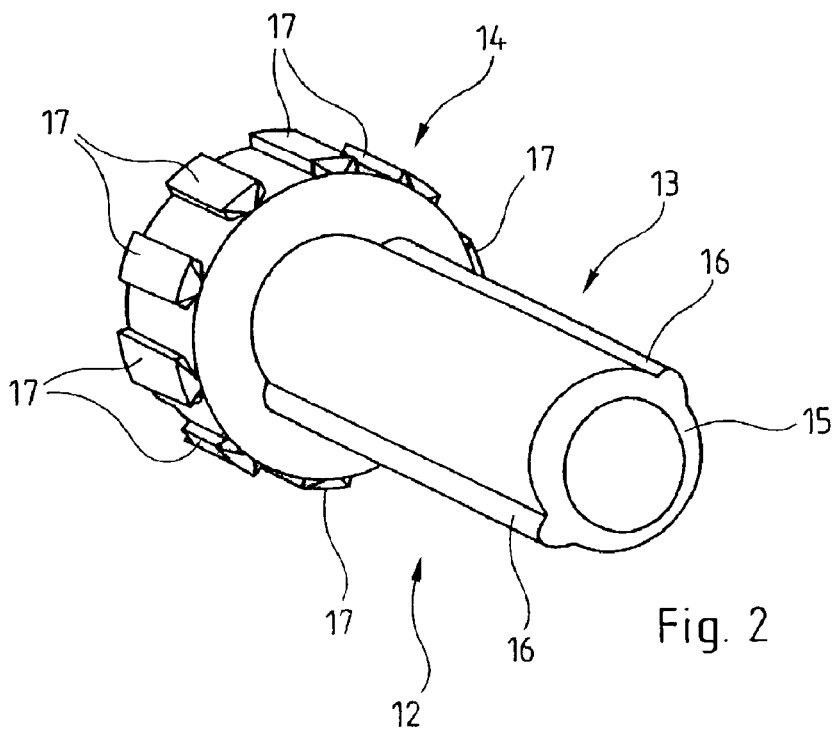
FIG. 2 is a perspective view of the rotor of the rotation-retarding device of FIG. 1.
Figure 3:
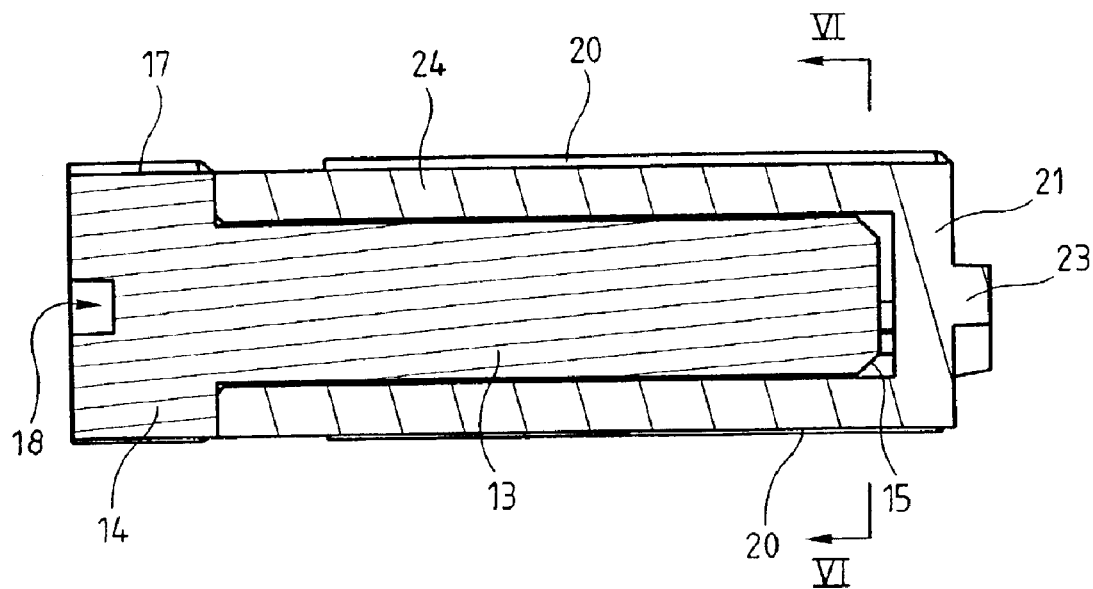
FIG. 3 is a longitudinal section view of this rotation-retarding device, taken on III—III of FIG. 1.
Figure 4:
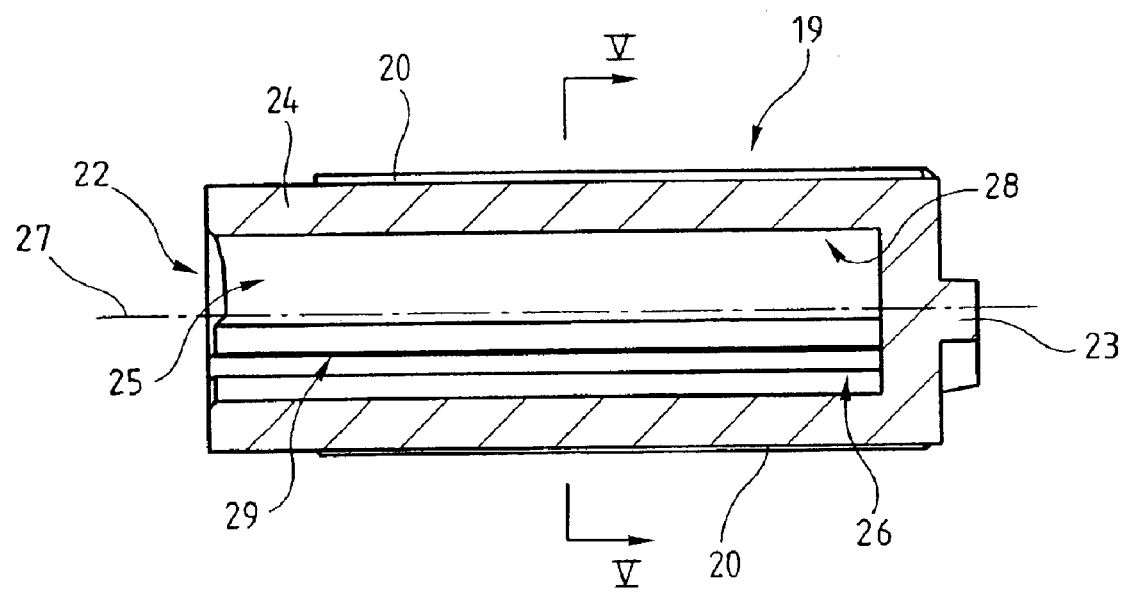
FIG. 4 is a section view similar to that of FIG. 3, which shows only the stator of the rotation-retarding device according to the present invention.
Figure 5:
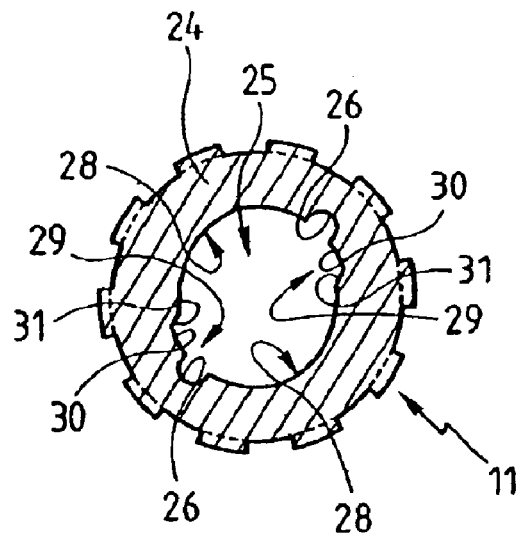
FIG. 5 is a cross-section view on line V—V of FIG. 4.

In practice, in the embodiment shown, the rotor 12 comprises, in a T-shaped general configuration and as is best seen in FIG. 2, an axle 13 with a generally cylindrical surface and a head 14 with a generally cylindrical surface.

The axle 13 has a frusto-conical free end 15 and comprises two diametrically opposite gadroons 16 extending along a generatrix of the axle.

A plurality of axial ribs 17, of rectangular cross-section, project from the cylindrical surface of the head 14 and are uniformly spaced around the periphery of this head 14.

These ribs 17 serve to block the rotation of the rotor 12 in a housing of cross-section complementary to that of the head 14, formed in a part, such as an opening member, of which the rotational movement is to be retarded. In the example described and shown, the rotor 13 is adapted to cooperate with a makeup box lid of which the opening is actuated by a spring.

A diametral slot 18 is furthermore formed in the head 14, on its side opposite to that from which the axle 13 projects, for the angular positioning of the rotor 12 in the housing already mentioned.

This axially symmetrical rotor 12 is a one-piece molding in plastics material. Preferably, as is the case of the embodiment shown, this rotor 12 is formed by molding in polyacetal.

As for the stator 11, this comprises an axially symmetrical tubular envelope 19, which also comprises axial ribs 20, of rectangular transverse section, projecting from the cylindrical surface of the envelope 19.

These ribs 20 extend from the closed end 21 of the envelope 19 to the vicinity of an opening 22 of this same envelope 19 and serve to block the rotation of the stator 11 in a housing of cross-section complementary to that of the exterior of the envelope 19, formed in a support member on which the opening member is rotatably mounted. In the example described and shown, this is a lug of a container of a make-up box.

The rotation-retarding device 10 thus constitutes a hinge of this make-up box.

In the embodiment shown, this tubular envelope 19 is a one-piece molding in elastically deformable flexible material. More particularly, the material is a thermoplastic elastomer with a hardness between a shore A value of 55 and a shore D value of 50.

Preferably, as is the case of the embodiment shown, this thermoplastic elastomer is Santoprene®.

It should also be noted, in this connection, that the end wall forming the closed end 21 of the tubular envelope 19 has, projecting from its outer surface, a rib 23 for angular positioning of the stator 11 in the matching housing with which it is adapted to cooperate.

Figure 6:
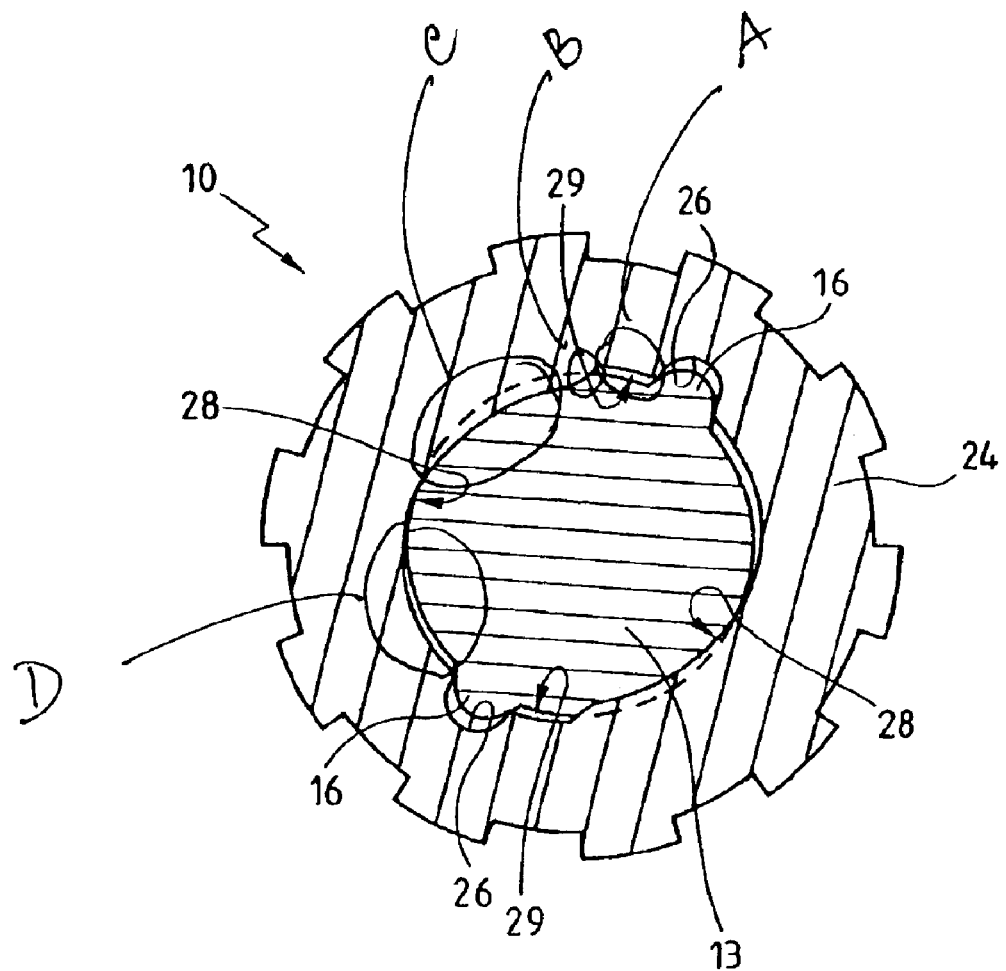
FIG. 6 is a section view, to a higher scale, similar to that of FIG. 5, on line VI—VI of FIG. 3.

According to the invention, and as is the case in the embodiment shown, the axially symmetrical tubular envelope 19 forms the wall 24 of a housing 25 adapted to receive the axle 13 of the rotor 12, with slight radial compression of said material making up the wall 24 (see FIG. 6), by means of which this rotor 12 is engaged with the stator 11.

The resting position of the rotation-retarding device 10 is however arranged in such a manner that the elastically deformable flexible material is not subject to a high level of stress at the location of the gadroons 16, in order to avoid persisting deformation of this material, and so avoid variations in the performance (position registering) of the rotation-retarding device 10 during its life.

To this end, the wall 24 comprises, for each gadroon 16 of the rotor 12, a groove 26 of U-shaped cross-section, extending substantially parallel to the axis of symmetry 27 of the wall 27 of the housing 25. As may be seen on FIG. 6, the gadroons 16 are each housed in one of these grooves 26 in a resting position which, in practice, corresponds to the closed position of the make-up box, that is to say the position which the latter occupies most often.

According to the invention, as is the case for the embodiment shown, the wall 24 of the housing 25 also has, facing the axis 13 of the rotor 12, two working surfaces 28 of cam form, which are symmetrical with respect to the axis of symmetry 27, and each adapted to cooperate with one of the gadroons 16 of the rotor 12 to retard the movement of this rotor 12 when it is caused to rotate by an opening member, such as the lid of the make-up box.

In practice, the braking or resisting couple is generated partly by friction between the axle 13 and the wall 24 of the housing 25, and the remaining part by deformation of the elastomer of the wall 24 by means of the gadroons 16 (viscoelastic behavior).

Preferably, the friction is limited in favor of the deformation, since the latter is less sensitive to environmental factors (greater or lesser ambient humidity, possible pollution, etc.).

It should be noted in this connection, that the level of the braking couple may easily be modified according to circumstances by selecting the hardness of the thermoplastic elastomer and/or the level of interference between the gadroons 16 and the cam formations of the working surfaces 28 associated with these gadroons 16.

Furthermore, according to the invention, the resisting couple is adapted to the driving couple at each angular position by virtue of the use of the working surfaces 28 of cam form. In practice, this cam form is defined so as to adapt the resisting couple to the driving couple at each angular position in a given application. Thus, in the case of the application to an opening member actuated to open by a spring, the resisting couple generated by the gadroons 16 passing over the cam forms matches with the couple generated by the weight of the opening member to be braked and with the couple provided by the spring, in order to guarantee the quality of movement as well as complete opening.

Preferably, as is the case in the embodiment shown, the working surfaces 28 of cam form extend the entire length of the wall 24 of the housing 25 and are each linked to one of the grooves 26 by a longitudinal recess 29 formed by two facets 30 and 31 which together form an obtuse angle. These recesses 29 and grooves 26 are, like the working surfaces 28, symmetrical in relation to the axis of symmetry 27 of the wall 24.

Thus, in practice, the gadroons 16 are housed in the grooves 26 while the opening member is in the resting position, that is to say in the closed position (horizontal position here), when the opening member is, for example, a make-up box lid.

Next, when the opening member passes from its closed position to its open position, the gadroons 16 pass firstly over the recesses 29 which create a relatively low resisting couple, giving way to the large driving couple provided by the spring of the opening member at the start of travel in the opening movement of the latter.

Next, the gadroons 16 come into engagement with the working surfaces 28 of cam form, of which the configuration is such that the resisting couple generated is initially relatively great then decreases progressively in order to achieve complete opening of the opening member with progressive retarding.

Numerous variants are possible according to circumstances.

In particular, a cam form corresponding to another type of opening could be implemented, such as the passage of an opening member from a vertical position to a horizontal position, in particular under the sole action of gravity.

It should be noted in this connection, that a rotation-retarding device as described above could serve for two different types of opening, according to whether it is placed on one side or the other of the opening member.

The rotor 12 and stator 11 may also be changed over in their function (the rotor can be the stator and vice-versa).

Furthermore, it is also possible to employ only a single gadroon, in which case one of the working surfaces then has a profile of an arc of a circle.

It is, of course, also possible to use more than two gadroons (with a corresponding number of working surfaces of cam form), or even to replace them by another form of projection, such as a stud or a line of studs. It is then sufficient for one or more parts of the wall of the housing to be of elastically deformable flexible material and for each working surface of cam form to extend over one or more parts of the length of that wall.

A housing wall consisting of a cylindrical part of elastically deformable flexible material housed in a rigid tubular envelope could also be used.

The material making up the rotor can also be a polyolefin, such as polypropylene, or a polyamide.

The axial ribs of the rotor and stator can also be replaced by other connection means by which they are respectively connected to a first and a second part having rotational movement relative to each other to be retarded.

Finally, it should be noted in this regard that the invention is not limited to the form of the embodiment described and represented, but covers any variant form.

What is claimed is:

1. A rotation-retarding device, comprising a first member and a second member rotatable relative to said first member;
   the first member comprising an axle and the second member comprising a housing receiving the axle of the first member;
   wherein
   at least a part of a wall of the housing is made of elastically deformable flexible material and comprises at least one working surface of cam form facing the axle of the first member; and
   the axle has thereon at least one projection of rigid material said at least one projection being adapted to cooperate with said at least one working surface to retard relative rotational movement of said first and second members by deformation of said elactically deformable flexible material, said deformation increasing in an initial stage and decreasing in a subsequent stage of the relative rotational movement.

2. A rotation-retarding device according to claim 1, wherein the entirety of said wall of the housing is of said elastically deformable flexible material.

3. A rotation-retarding device according to claim 2, wherein said at least one working surface extends over an entire axial length of the wall of the housing.

4. A rotation-retarding device according to claim 3, wherein the wall of the housing comprises two said working surfaces of cam form which are symmetrical with respect to an axis of symmetry of the wall.

5. A rotation-retarding device according to claim 1, wherein said at least one projection includes a gadroon extending along a generatrix of the axle of the first member.

6. A rotation-retarding device according to claim 1, wherein the wall comprises a hollow for housing said at least one projection in a resting position.

7. A rotation-retarding device according to claim 5, wherein the wall comprises at least one groove of U-shaped cross-section, extending substantially parallel to the axis of symmetry of the wall and adapted to receive the gadroon in a resting position.

8. A rotation-retarding device according to claim 7, wherein said at least one groove is connected to said at least one working surface, which is adapted to cooperate with the gadroon housed in that groove in the resting position, by a longitudinal recess formed by two facets which together form an obtuse angle.

9. A rotation-retarding device according to claim 4, wherein
   said at least one projection includes two gadroons extending along a generatrix of the axle of the first member; and
   the wall comprises two grooves, each adapted to receive one of the two gadroons diametrically opposite of the axle of the first member, these grooves and the working surfaces being respectively symmetrical with respect to the axis of symmetry of the wall of the housing.

10. A rotation-retarding device according to claim 1, wherein the elastically deformable flexible material is a thermoplastic elastomer.

11. A rotation-retarding device according to claim 10, wherein the thermoplastic elastomer has a hardness between a shore A value of 55 and a shore D value of 50.

12. A rotation-retarding device according to claim 10, wherein the thermoplastic elastomer is Santoprene®.

13. A rotation-retarding device according to claim 1, wherein the rigid material of said at least one projection is chosen from the group consisting of a polyether, a polyolefin, and a polyamide.

14. A rotation-retarding device according to claim 13, wherein the polyether is a polyacetal.

15. A rotation-retarding device according to claim 1, wherein
   the first member is a rotor comprising, in a T-shaped general configuration, the axle extended by a coaxial head; and
   the second member is a stator comprising an axially symmetrical tubular envelope forming the wall of the housing.

16. A rotation-retarding device according to claim 15, wherein each of the head and the envelope comprise a connection element for respectively connecting the rotor and the stator to a first part and a second part having rotational movement relative to each other to be retarded.

17. A rotation-retarding device according to claim 1, wherein the axle of the first member is housed in the housing of the second member with radial compression of the elastically deformable flexible material.

18. A rotation-retarding device according to claim 1, wherein said at least one projection is integrally formed with the axle.

19. A rotation-retarding device, comprising:
   a housing;
   a shaft received in and rotatably supported by said housing, said housing and said shaft having wall portions facing each other;
   at least one projection provided on a first one of said wall portions; and
   at least one cam surface provided on a second one of said wall portions, said cam surface being elastically deformable by said projection during a relative rotational movement of said housing and said shall from a rest position so as to retard said relative rotational movement;
   wherein
   the second wall portion further includes, adjacent said cam surface, a groove in which said projection is received in said rest position; and
   in said rest position, the first wall portion deforms said cam surface outside said groove.

20. A rotation-retarding device according to claim 19, wherein
   said second wall is an inner wall of said housing, the entirety of said second wall portion being of elastically deformable flexible material; and
   said projection is made integrally with said shaft and of a material more rigid than said elastically deformable flexible material.

21. A rotation-retarding device according to claim 19, wherein said projection causes greater deformation of said cam surface at an initial stage of the relative rotational movement than at a subsequent stage of the relative rotational movement.

22. A rotation-retarding device according to claim 19, wherein said cam surface is an inner wall surface of said housing and includes
   a first section extending radially inwardly of said housing and circumferentially away from the groove in a direction of said relative rotational movement, and
   a second section extending radially outwardly of said housing and circumferentially away from the first section in the direction of said relative rotational movement.

23. A rotation-retarding device according to claim 22, wherein, in said rest position, said shaft deforms said cam surface in the second section.

24. A rotation-retarding device according to claim 22, wherein a circumferential extent of the second section is greater than that of the first section.

25. A rotation-retarding device according to claim 22, wherein
   the first section includes, in the direction of said relative rotational movement, a first sub-section adjacent the groove, and a second sub-section adjacent the first sub-section; and
   said projection causes greater deformation of said cam surface in the second sub-section than in the first sub-section.

26. A rotation-retarding device according to claim 25, wherein
   the second section includes, in the direction of said relative rotational movement, a third sub-section adjacent the second sub-section, and a fourth sub-section adjacent the third sub-section;
   said projection causes greater deformation of said cam surface in the third sub-section than in the fourth sub-section; and
   said projection causes less deformation of said cam surface in the third sub-section than in the second sub-section.

27. A rotation-retarding device according to claim 22, wherein
   the second section includes, in the direction of said relative rotational movement, a third section adjacent the first section, and a fourth section adjacent the third section; and
   said projection causes greater deformation of said cam surface in the third section than in the fourth section.

28. A rotation-retarding according to claim 27, wherein, in said rest position, said shaft deforms said cam surface in the third section and is spaced from said cam surface in the fourth section.

29. A rotation-retarding device according to claim 19, wherein
   said first wall portion includes a number of said projections;
   said second wall portion includes a corresponding number of said cam surfaces and said grooves alternately arranged; and
   said projections, said cam surfaces and said grooves are arranged at regular intervals circumferentially of said housing and said shaft.

* * * * *